Jan. 26, 1960  R. Y. MINER ET AL  2,922,572
ORDNANCE CALCULATING APPARATUS

Filed June 4, 1953  3 Sheets-Sheet 1

INVENTOR.
RICHARD Y. MINER
QUENTIN J. EVANS
BY
Raymond A. Paquin
ATTORNEY.

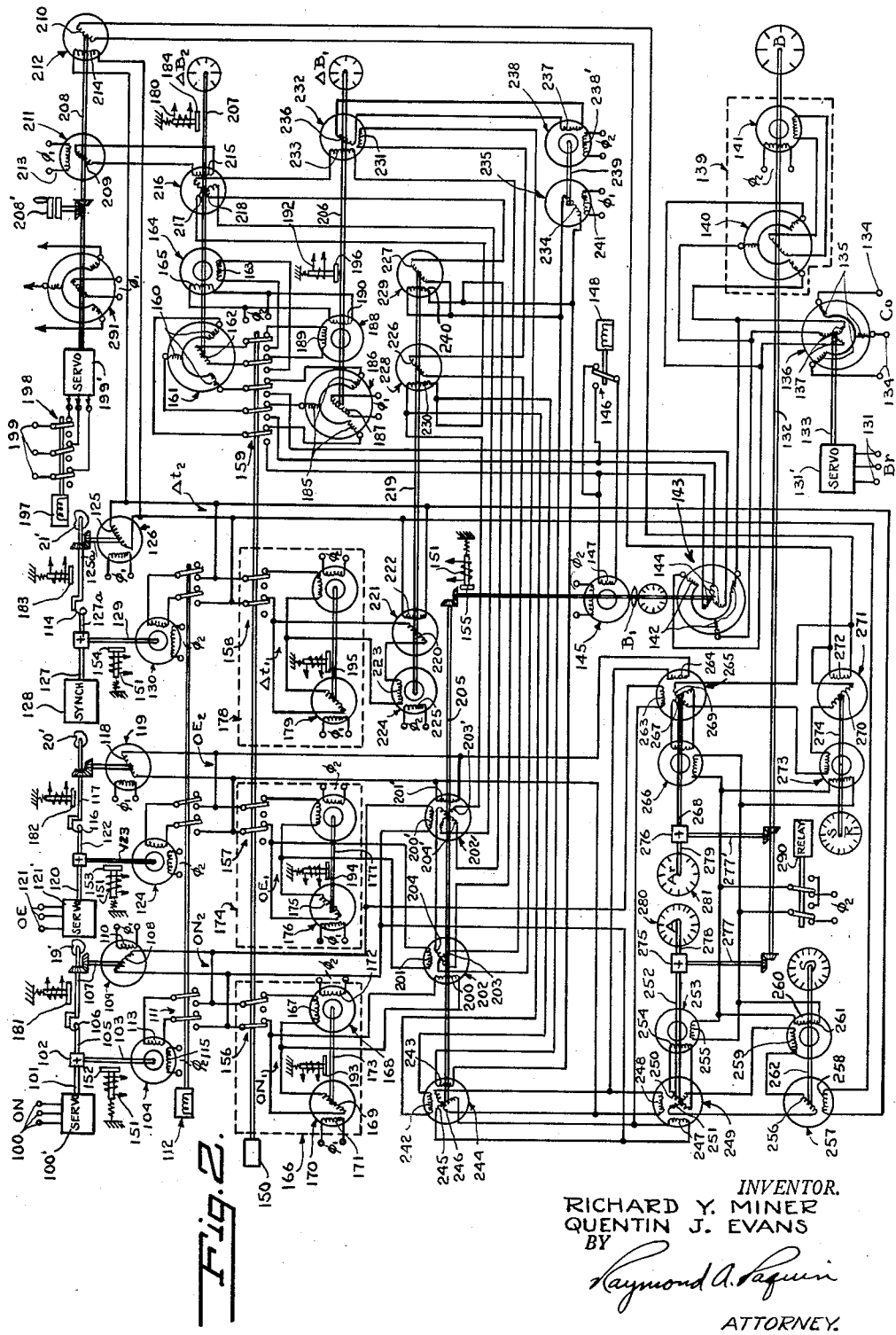

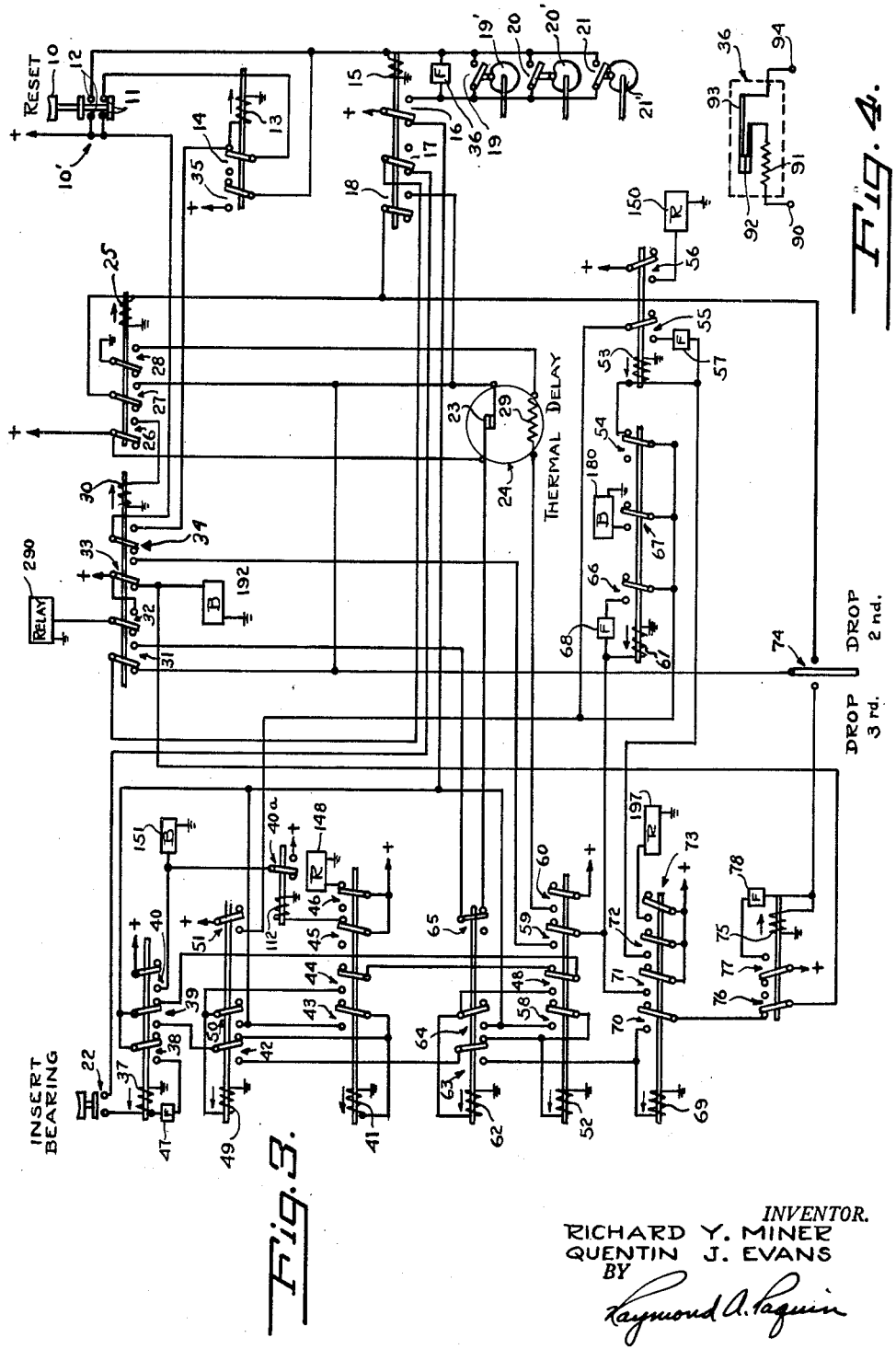

United States Patent Office 2,922,572
Patented Jan. 26, 1960

2,922,572

ORDNANCE CALCULATING APPARATUS

Richard Y. Miner, Port Washington, and Quentin J. Evans, Long Island City, N.Y., assignors to American Bosch Arma Corporation, a corporation of New York Application June 4, 1953, Serial No. 359,591

6 Claims. (Cl. 235—61.5)

The present invention relates to ordnance calculating apparatus and has particular reference to a device for determining the course and speed of a moving target from observations of bearings taken at three different times, and one observation of range.

The basic theoretical problem is that of placing a straight line across the three observed bearing lines in a manner such that the lengths of the line segments are proportional to the elapsed time intervals. The direction of this line is the course of the vessel and the solution is completed with a knowledge of the range at the third observation to choose the particular course line which results in the target being at the known third position at the third observation.

The problem and its solution is more easily described with the aid of drawings and for a better understanding of the problem, the invention and its operation, reference may be had to the accompanying drawings, in which, Fig. 1 illustrates the geometrical problem to be solved;

Fig. 2 is a schematic wiring diagram of the solution circuit;

Fig. 3 is a circuit diagram of the control relays;

Fig. 4 is a preferred time delay unit;

Figures 1, 5:
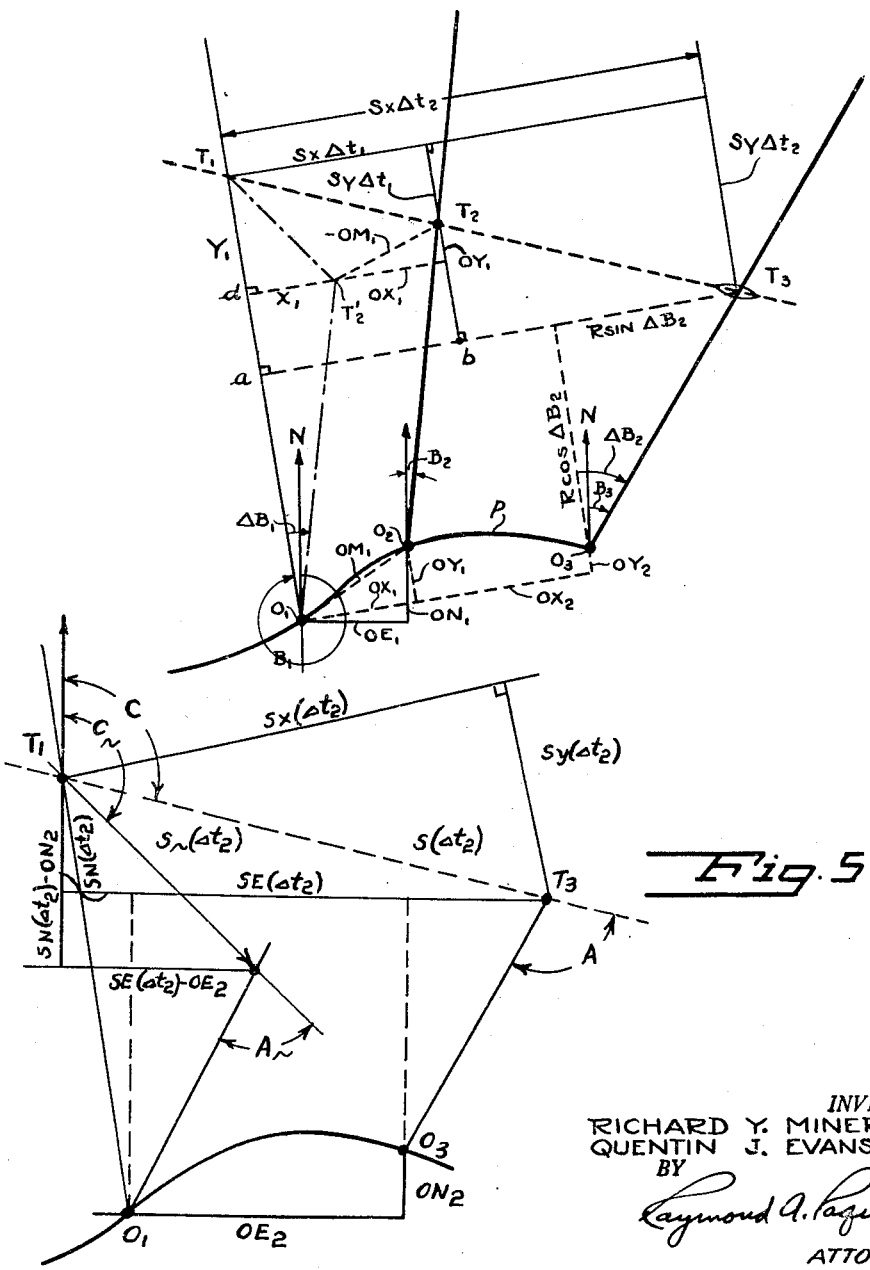
Fig. 5 illustrates certain values which were omitted from Fig. 1 in the interest of clarity.

With reference to Figure 1 of the drawings own ship O is traveling along a path P and passes through the points $O_1$, $O_2$ and $O_3$ at times $t_1$, $t_2$ and $t_3$ respectively. At the three positions $O_1$, $O_2$ and $O_3$ observations of true bearing of the target are taken which are designated as $B_1$, $B_2$ and $B_3$ respectively, and in addition an observation of range R to the target $T_3$ is taken at $O_3$. From these input values of range, three bearings and three corresponding time values, the speed and course of the target is determined by the present invention in the manner to be described, assuming that the target remains on a steady course and speed.

The problem may be solved geometrically as follows:

From the target position $T_3$ which is located according to R on $B_3$ from which it will be seen that the position $T_3$ is located at a distance R from $O_3$ and is in a direction defined by the true bearing $B_3$, a line $T_3a$ is drawn perpendicular to the line of sight from $O_1$. On the line $T_3a$ the point $b$ is located at a position such that the ratio of $ab/aT_3$ is equal to the ratio $t_2-t_1/t_3-t_1$. From $b$ a line is drawn parallel to $B_1$ and the intersection, $T_2$, of that line with the line of sight from $O_2$ is the position of the target at time $t_2$. The extension of line $T_3T_2$ intersects the line of sight from $O_1$ at the point $T_1$, which is the position of the target at $T_1$. The points $T_2$ and $T_3$ determine the target course while the speed of the target may be found by dividing the distance $T_1T_3$ by the elapsed time $t_3-t_1$.

In the present invention the procedure outlined above is carried out by electro-mechanical means. Referring again to Fig. 1 the relative target travel from $T_1$ to $T_2$ is indicated by the line $T_1T_2'$. A line $T_2'd$ is drawn perpendicular to $O_1T_1$ and the right triangle $T_2'dO_1$ is completed by drawing line $O_1T_2'$. In the right triangle $T_2'dO_1$ the ratio of $T_2'd$ to $O_1d$ is the tangent of the known angle $\Delta B_1 (=B_2-B_1)$ at $O_1$ and this forms the basis of the instrumentation of the problem.

It will be seen from Fig. 1 that $$T_2'd = ab - OX_1$$

where $ab$ is equal to $Sx\Delta t_1$, the product of the target speed in the $x$ direction (perpendicular to $O_1T_1$) and the elapsed time $\Delta t_1$ between the observations at $t_2$ and $t_1$, and $OX_1$ is the motion of own ship in the $x$ direction in the time $\Delta t_1$ or $$T_2'd = S_x\Delta t_1 - OX_1 \quad (1)$$

Also, it will be seen from Fig. 1 that $$O_1d = O_1T_1 - T_1d$$

or $$O_1d = OY_2 + R \cos \Delta B_2 + Sy\Delta t_2 - Sy\Delta t_1 - OY_1 \quad (2)$$

where:

$OY_2$ is the motion of own ship in the $y$ direction (parallel to $O_1T_1$) during the time $\Delta t_2 = t_3 - t_1$ $\Delta B_2$ is the change in bearings at $O_1$ and $O_3$ $Sy$ is the speed of the target in the $y$ direction, and $OY_1$ is the motion of own ship in the $y$ direction in the time interval $\Delta t_1 = t_2 - t_1$ It can therefore be written that $$\tan \Delta B_1 = \frac{Sx\Delta t_1 - OX_1}{R \cos \Delta B_2 + Sy\Delta t_2 - Sy\Delta t_1 + OY_2 - OY_1} \quad (3)$$

Equation 3 can be rewritten by substituting $$\sin \Delta B_1 / \cos \Delta B_1$$

for $\tan \Delta B_1$ and clearing fractions. Thus:

$$(R \cos \Delta B_2 + Sy\Delta t_2 - Sy\Delta t_1 + OY_2 - OY_1) \sin \Delta B_1 - (Sx\Delta t_1 - OX_1 \cos \Delta B_1 = 0 \quad (4)$$

It will be seen that the quantity $Sx\Delta t_1$ can be expressed in terms of known quantities. Thus, from Fig. 1 it is clear that $$Sx\Delta t_2 = R \sin \Delta B_2 + OX_2 \quad (5)$$

Where $OX_2$ is the motion of own ship in the $x$ direction during elapsed time $\Delta t_2$.

Since the target is traveling on a steady course at constant speed, $Sx\Delta t_1$ is equal to $$S_x\Delta t_2\left(\frac{\Delta t_1}{\Delta t_2}\right)$$

Therefore:

$$Sx\Delta t_1 = Sx\Delta t_2\left(\frac{\Delta t_1}{\Delta t_2}\right) = \left[R \sin \Delta B_2 + OX_2\right]\frac{\Delta t_1}{\Delta t_2} \quad (6)$$

For easy reference the quantities used in the solution of Equations 4, 5 and 6 and their respective symbols are listed below:

$t_1$, $t_2$, $t_3$—three instants of time at which the three observations are taken $B_1$, $B_2$, $B_3$—true bearing of target at time $t_1$, $t_2$, $t_3$ respectively $\Delta t_1$—time interval elapsed between first and second observation ($=t_2-t_1$)

$\Delta t_2$—time interval elapsed between first and third observation ($=t_3-t_1$)

$\Delta B_1$—change in bearing during $\Delta t_1 (=B_2-B_1)$ $\Delta B_2$—change in bearing during $\Delta t_2 (=B_3-B_1)$ $ON_1(OE_1)$—travel of own ship north (east) during $\Delta t_1$ $ON_2(OE_2)$—travel of own ship north (east) during $\Delta t_2$ $OX_1(OY_1)$—travel of own ship perpendicular (parallel) to direction of $B_1$ during $\Delta t_1$ $OX_2(OY_2)$—travel of own ship perpendicular (parallel) to direction of $B_1$ during $\Delta t_2$ R—range to target at time $t_3$ S—target speed (subscripts $x$, $y$, N, E indicate components of S in the corresponding direction)

Using Equation 5 the value of $Sx\Delta t_2$ may be found, and using this value as in Equation 6 for determination of $Sx\Delta t_1$, Equation 4 may be solved for $Sy\Delta t_2$, since $$Sy\Delta t_1 = Sy\Delta t_2\left(\frac{\Delta t_1}{\Delta t_2}\right)$$

The values $Sx\Delta t_2$ and $Sy\Delta t_2$ are resolved into north and east components to determine the distances $SN\Delta t_2$ and $SE\Delta t_2$ traveled by the target north and east in the time $\Delta t_2$. These component distances are added vectorially to give the distance $S\Delta t_2$ traveled by the target and the course, C, of the target, as shown in Fig. 4.

Thus, $$C = \text{arc tan } \frac{SE\Delta t_2}{SN\Delta t_2}$$

and $$S\Delta t_2 = \sqrt{(SE\Delta t_2)^2 + (SN\Delta t_2)^2}$$

The $S\Delta t_2$ value is then divided by the elapsed time $\Delta t_2$ to determine the speed S of the target.

Thus, from observations of bearings at three different times, one observation of range and a knowledge of own ship's motion, the course and speed of a target can be determined. It will be seen that additional utility and accuracy is provided by arranging the circuit so that the second or third observation may be discarded, maintaining the remaining observations as the first and second observation and accepting new data for the third observation.

Referring now to Figure 2 the instrumentation of the solution will be described. The motors in the diagram are preferably two phase induction motors in which the main field windings are constantly energized by one phase, $\phi_2$, of an alternating two-phase voltage supply and the voltage of the control fields is derived from the other phase, $\phi_1$, of the voltage supply. The successful operation of electro mechanical circuits such as shown in Fig. 2 requires amplifiers, phase shifters, scaling elements and the like. Those familiar with the art will recognize their necessity, but for the sake of simplicity these elements have been omitted from the diagram.

The phrase "proportional to" when used in describing voltages or shaft displacements should be taken to mean that the magnitude of the voltage or displacement is proportional to the magnitude of the quantity in question, and that the phase of the voltage or direction of shaft displacement from zero reverses with change in sign of the quantity.

Assuming for the moment that the values of $ON_1$, $OE_1$, $ON_2$, $OE_2$, $\Delta t_1$, $\Delta t_2$, $\Delta B_1$, $\Delta B_2$, R, and $B_1$ are available as voltages or shaft displacements the solution of Equation 5 for $Sy$ and Equation 4 for $Sx$ will be described. It will be shown later how the required input values are obtained.

The $ON_1$ and $OE_1$ voltages energize the primary or stator windings 200, 201 respectively of resolver 202, found near the left center of Fig. 2. The $ON_2$ and $OE_2$ voltages energize the primary or stator windings 200', 201' of resolver 202'. The rotor windings 203, 204 of resolver 202 and rotor windings 203', 204' of resolver 202' are displaced according to $B_1$ by the shaft 205. The output of rotor winding 203 is therefore proportional to $$ON_1 \sin B_1 + OE_1 \cos B_1 = OX_1$$

Similarly, the output of rotor winding 204 is proportional to $OY_1$, the output of rotor winding 203' is proportional to $OX_2$ and the output of rotor winding 204' is proportional to $OY_2$. It will be recognized that the resolvers 202 and 202' constitute coordinate transformation devices of well known operation.

The shafts 206 and 207 are displaced according to $\Delta B_1$ and $\Delta B_2$ respectively and shaft 208 is displaced according to R. Shaft 208 drives the rotor windings 209 and 210 of potentiometers 211 and 212, the respective stator windings 213 and 214 of which are energized by a constant alternating voltage $\phi_1$ and by the $\Delta t_2$ voltage respectively.

The R output of rotor winding 209 energizes the stator winding 215 of resolver 216, the rotor windings 217 and 218 of which are driven by shaft 207 according to $\Delta B_2$. The outputs of the rotor windings 217 and 218 are therefore proportional to $R \sin \Delta B_2$ and $R \cos \Delta B_2$ respectively.

The $\Delta t_2$ and $\Delta t_1$ voltages combine to set up shaft 219 proportionally to the ratio $$\frac{\Delta t_1}{\Delta t_2}$$

in the following manner: The $\Delta t_1$ voltage is connected in series with the output of rotor winding 220 of induction potentiometer 221, the stator winding 222 of which is energized by the $\Delta t_2$ voltage, and the difference voltage energizes the control field winding 223 of motor 224, the main field winding 225 of which is energized by $\phi_2$. Motor 224 therefore drives shaft 219 and rotor winding 220 until the output of rotor winding 220 is equal to the $\Delta t_1$ voltage and the voltage energizing motor 224 is zero. In this condition the displacement of shaft 219 must be proportional to $$\frac{\Delta t_1}{\Delta t_2}$$

since the product of rotor winding 220 displacement and stator winding 222 excitation is equal to the $\Delta t_1$ voltage. That is, $$\Delta t_2\left(\frac{\Delta t_1}{\Delta t_2}\right) = \Delta t_1$$

Shaft 219 drives the rotor windings 226 and 227 of induction potentiometers 228 and 229 respectively. The primary winding 230 of potentiometer 228 is connected in series with secondary windings 203' and 217 so that the voltage energizing stator winding 230 is the sum of the voltages of windings 203' and 217 or is proportional to $R \sin \Delta B_2 + OX_2$. It will be seen from Equation 5 that $R \sin \Delta B_2 + OX_2$ is equal to $Sx\Delta t_2$, whence the excitation voltage of primary winding 230 is proportional to $Sx\Delta t_2$. Since the displacement of rotor winding 226 is proportional to $$\frac{\Delta t_1}{\Delta t_2}$$

the output voltage of rotor winding 226 is proportional to $$Sx\Delta t_2\left(\frac{\Delta t_1}{\Delta t_2}\right)$$

or $Sx\Delta t_1$.

The rotor windings 226 and 203 are electrically connected in series with stator winding 231 of resolver 232 so that the voltage energizing stator winding 231 is the difference between the outputs of rotor windings 226 and 203 or is proportional to $Sx\Delta t_1 - OX_1$. The other stator winding 233 of resolver 232 is energized by the combined outputs of rotor winding 218 of resolver 216, rotor windings 204 and 204' of resolvers 202 and 202', rotor winding 227 of potentiometer 229 and rotor winding 234 of potentiometer 235.

Rotor winding 234 is also connected to energize the stator or primary winding 240 of potentiometer 229 so that if the output of rotor winding 234 is designated by $\theta$ for the present, the output of rotor winding 227 is proportional to $$\theta\left(\frac{\Delta t_1}{\Delta t_2}\right)$$

The excitation voltage of stator winding 233 may then be written as the following:

$$R \cos \Delta B_2 + OY_2 - OY_1 + \theta - \theta\left(\frac{\Delta t_1}{\Delta t_2}\right)$$

The secondary or rotor winding 236 of resolver 232 is displaced according to $\Delta B_1$ by shaft 206 and the output of secondary winding 236 energizes the control field winding 237 of motor 238, the main field winding 238' of which is energized by $\phi_2$. Motor 238 drives shaft 239 and thereby displaces the rotor winding 234 of potentiometer 235, the primary winding 241 of which is energized by $\phi_1$, until the voltage energizing control field winding 237 is zero. In this condition the voltage induced in rotor winding 236 is zero and the following relationship holds:

$$\left(R \cos \Delta B_2 + OY_2 - OY_1 + \theta - \theta\frac{\Delta t_1}{\Delta t_2}\right) \sin \Delta B_1$$

$$- (Sx\Delta t_1 - Ox_1) \cos \Delta B_1 = 0 \quad (7)$$

Comparison of Equation 7 with Equation 4 shows that the output of potentiometer 235, $\theta$, must be proportional to $Sy\Delta t_2$ when the motor 238 is deenergized. Thus, the values for $Sx\Delta t_2$ and $Sy\Delta t_2$, have been determined by the instrument, and are available as the voltages at stator winding 230 and the output of rotor winding 234 respectively. The $Sx\Delta t_2$ and $Sy\Delta t_2$ voltages are applied to the stator or primary windings 242 and 243 respectively of resolver 244, the rotor windings 245 and 246 of which are driven by shaft 205. The outputs of rotor windings 245 and 246 are respectively:

$$Sx\Delta t_2 \sin B_1 + Sy\Delta t_2 \cos B_1 = SN\Delta t_2$$

and $$Sx\Delta t_2 \cos B_1 - Sy\Delta t_2 \sin B_1 = SE\Delta t_2$$

or the distances traveled north and east by the target during the time $\Delta t_2$. The distance traveled by the target is found by composing the vectors $SN\Delta t_2$ and $SE\Delta t_2$ into $S\Delta t_2$ and the speed is found by dividing the resultant distance by $\Delta t_2$. Thus: the outputs of rotor windings 245 and 246 energize the stator windings 247 and 248 of resolver 249 the rotor windings 250 and 251 are driven by shaft 252 of motor 253. The control field winding 254 of motor 253 is energized by the rotor winding 250 while main field winding 255 is energized by $\phi_2$. Motor 253 is therefore energized to drive the rotor winding 250 towards the null position where the displacement of rotor winding 250 corresponds to the $$\text{arc tan } \frac{SE\Delta t_2}{SN\Delta t_2}$$

or to the course C of the target. The output of the rotor winding 251 in this position is $\sqrt{(SN\Delta t_2)^2 + (SE\Delta t_2)^2}$ or $S\Delta t_2$, the distance traveled by the target during elapsed time $\Delta t_2$. The $S\Delta t_2$ output or rotor winding 251 is matched against the voltage output of secondary windings 256 of potentiometer 257, the primary winding 258 of which is energized by $\Delta t_2$, and the error voltage is used to energize the control field winding 259 of motor 260. The main field winding 261 of motor 260 is energized by $\phi_2$ and motor 260 drives the rotor winding 256 by means of shaft 262 until the output of rotor winding 256 is equal to the $S\Delta t_2$ output of rotor winding 251. In this condition, the displacement of shaft 262 must be proportional to S since the output of rotor winding 256 is $S\Delta t_2$ and the excitation of primary winding 258 is $\Delta t_2$.

In a similar circuit the relative course of the target, Cr, or the angle whose tangent is equal to the ratio of the relative motion of the target east to the relative motion of the target north, is determined by energizing the stator windings 263 and 264 of resolver 265 by the voltages $SN\Delta t_2 - ON_2$ and $SE\Delta t_2 - OE_2$ derived by substracting the $ON_2$ and $OE_2$ signal voltages from the outputs of rotor windings 245 and 246 respectively. The physical relationship between these values is illustrated in Fig. 4. Motor 266 is energized by the output of rotor winding 267 and drives shaft 268 and rotor winding 267 until the output of rotor winding 267 is zero, whence the displacement of shaft 268 is proportional to Cr, the relative course. The output of the rotor winding 269 of resolver 265 is then the relative distance traveled by the target, $Sr\Delta t_2$, in the time $\Delta t_2$, where Sr is the relative speed. The output of rotor winding 269 is matched against the error of the output of rotor winding 270 of potentiometer 271 and the excitation voltage of the primary winding 272 of potentiometer 271. The error voltage energizes motor 273 which drives the rotor winding 270 until the error voltage is zero. The primary winding 272 of potentiometer 271 is energized by the $R\Delta t_2$ output of potentiometer 212 and the displacement M of rotor winding 270 at the solution position can be found by the following relationship.

$$Sr\Delta t_2 = MR\Delta t_2 + R\Delta t_2$$

$$\frac{Sr - R}{R} = M = \frac{Sr}{R} - 1$$

By this arrangement, the shaft displacement is a function of $Sr/R$. The factor of unity is the result of adding the excitation voltage $R\Delta t_2$ to the potentiometer output, a device by which the sensitivity of the instrument is increased. If the $R\Delta t_2$ voltage were not added, then M would theoretically be $Sr/R$.

For utility in the usual fire control instruments, the target angle A and relative target angle Ar should be found. The target angle may be defined as the angle between the target path and the line of sight measured clockwise from the target path, whereas the relative target angle is defined as the angle between the relative motion line and the line of sight measured clockwise from the relative motion line. For this purpose the C and Cr shafts 252 and 268 respectively drive one of the inputs of the respective mechanical differentials 275 and 276 while the shaft 132 which is displaced according to bearing B drives the other input of both differentials. The output shafts 278 and 279 are displaced according to the difference between the outputs or $B-C$ and $B-Cr$ respectively. Angles A and Ar which are the supplementary angles of $B-C$ and $B-Cr$ can be read directly on the properly calibrated dials 280 and 281 attached to shafts 278 and 279 respectively.

It has been shown how the instrument arrives at a solution for course and speed of the target from signal voltages of $ON_1$, $ON_2$, $OE_1$, $OE_2$, $\Delta t_1$, $\Delta t_2$, $\Delta B_1$, $\Delta B_2$, and R. It will now be shown where and how these signals are produced. A self synchronous signal corresponding to the travel of own ships north, ON, is received at terminals 100 from position plotting equipment elsewhere on the vessel and is transformed into a displacement of shaft 101 in the well known manner by use of a servo motor. The servo system is indicated merely by the rectangle 100' marked "servo." Shaft 101 is one input to mechanical differential 102, the other input shaft 103 of which is driven by motor 104 and the output shaft 105 of which is connected by means of spring drive 106 to the shaft 107. Shaft 107 drives rotor winding 108 of induction potentiometer 109, the primary winding 110 of which is energized by $\phi_1$. When switch 111 is urged to the left by relay 112 the output of rotor winding 108 is connected to the control field winding 113 of motor 104, the main field winding 115 of which is energized by $\phi_2$ so that motor 104 drives shaft 107 through the agency of shaft 105 and spring 106 until the output of rotor winding 108 is zero. This condition prevails during the "reset" period, the period during which the signal generating devices for own ships motion, time and bearing are returned to zero position, prior to the acceptance of bearing observation inputs.

In a similar manner, the rotor winding 118 of potentiometer 119 is driven jointly by shaft 120 of the servo system 121 which is responsive to the signal of own ship motion in the east direction OE received at terminals 121, and shaft 123 of motor 124. Also, rotor winding 125 of potentiometer 126 is driven jointly by shaft 127 of the synchronous motor 128, which rotates at a constant speed, and by shaft 129 of motor 130.

The input of true bearing is received as relative bearing B$r$ and course C$o$ which are combined to give true bearing, $B=Co+Br$. Thus, B$r$ is received at terminals 131 of servo system 131' to cause displacement of shaft 133 proportionally to B$r$. The C$o$ signal received at terminals 134 is applied to the stator windings 135 of self synchronous differential 136 the rotor windings 137 of which are driven by shaft 133. The signal induced in rotor windings 137 then corresponds to $Co+Br$ or B, and is used to cause displacement of shaft 132 accordingly by the servo system 139. The servo system 139 comprises a control transformer 140 energized by the rotor windings 137 and a motor 141 energized by the output of the control transformer 140 which, adjusts the control transformer 140 by means of shaft 132 to zero output.

The output of rotor windings 137 is also connected to energize stator winding 142 of self synchronous differential 143 the rotor windings 144 of which are driven by motor 145 by means of shaft 205. The voltage across two of the windings 144 is connected by means of switch 146 to the control field winding 147 of motor 145. Thus, motor 145 is energized to drive the rotor winding 144 into correspondence with the signal at stator winding 142 whence the displacement of shaft 205 corresponds to B. The switch 146 is operated by relay 148 which is energized during this operation as will be seen in the following description.

The reset period is initiated by depressing the reset button 10 found in Fig. 3. The control or relay circuitry is separately shown in Fig. 3 for the sake of clarity. In this circuit the plus symbol + is used to indicate the positive side of the relay and brake power supply, the negative side of which is connected to ground. One side of each of the relays in Figs. 2, 3 is also connected to ground. Thus, depression of the reset button 10 results in initiating the following sequence of events. Contacts 11 of the switch 10' are opened thereby interrupting the holding circuit from power supply + to relay winding 13 through the switch 14. Contacts 12 of switch 10' are closed to complete the circuit from power supply + to the relay winding 15. Energization of relay winding 15 draws the movable contacts of switches 16, 17 and 18 toward the relay, in this instance to the right, while deenergization of the relay winding 15 allows the movable contacts of switches 16, 17, 18 to be drawn to the left by a spring (not shown). In each of the relays shown in Fig. 2 or 3, the same action is supposed; i.e. energization draws the contacts toward the relay, while deenergization repels the contacts away from the relay winding.

Switches 16, 17 and 18 are thus closed to the right upon energization of relay winding 15 to accomplish the following: Switch 16 forms part of a holding circuit from power supply + through parallel connected switches 19, 20, 21 which are operated by "zero indicator cams" 19', 20' and 21'. The cam 19' is driven by the shaft 107 in Fig. 2, and when motor 104 drives shaft 107 to the zero position, switch 19 is opened for a purpose to be explained later. It should be noted now that switch 16 also interrupts the circuit between + and the relays at the left of Fig. 3 so that the relays at the left are all deenergized to the position shown, although the operation of the relays will be described in full later in this specification. Switch 17 opens the circuit from switch 22 so that no data can be inserted while the instrument is in the reset condition. Switch 18 completes the circuit from power supply + through contacts 23 of thermal delay 24 to the relay winding 25 thereby energizing relay winding 25 and actuating switches 26, 27 and 28 to the right in Fig. 3. Switch 27 is a holding switch completing an alternate path from + to winding 25, bypassing switch 18. Switch 28 connects the heater winding 29 of thermal delay 24 to ground in preparation for energization of the heater 29 at a later time. Switch 26 completes the circuit from + to the relay winding 30 so that relay winding 30 is energized to draw the movable contacts of switches 31, 32, 33 and 34 to the right in Fig. 3.

Switch 32 energizes relay winding 290 which controls the energization of the main field windings of the solution motors. When relay winding 290 is energized, the motors 253, 260, 266 and 273 are disabled and are not responsive to signals applied to their control field windings. Thus, during the period that relay winding 30 is energized, the solutions for C, S, C$r$ and S$r$/R are not available. Switch 33 connects the power supply + terminal to one side of switch 59 for purposes to become evident later. Switch 34 connects the power supply + terminal to relay winding 13 to energize winding 13 which is then held closed by switch 11 and 14 until the power is turned off or until the reset button 10 is again depressed. It will be noted that the switch 35 which is controlled by relay 13 connects the power supply + terminal to relay 15 when relay 13 is deenergized to initiate the reset cycle being described whenever the instrument is put into operation from a deenergized state. Switch 31 connects switch 17 in a series with switch 65 so that the circuit from power supply + to switch 22 is from switch 65, through switches 31 and 17 to switch 22.

It will be noted that the following conditions pertain during the reset period: relays 112 and 148 are energized, relay 150 is deenergized and magnetic brake windings 151, 180 and 192 are deenergized. The magnetic brakes of this description are such that the brakes are applied to the shafts upon energization, while the brakes are removed when deenergized. Thus, all motors are free to drive their respective shafts, and motor 104 drives rotor winding 108 to the zero position, where cam 19' opens switch 19. In a similar manner motor 124 drives rotor winding 118 and shaft 118$a$ to the zero position and motor 130 drives rotor winding 125 and shaft 125$a$ to the zero position, causing the cams 20' and 21' to open the switches 21 and 22 thereby indicating that the rotor windings 118 and 125 are in the zero position.

When all switches 19, 20 and 21 are open the relay winding 15 is still held energized by the current flowing through the time-delay unit 36. The delay unit 36 is a thermally operated device which opens the connection between the relay winding 15 and switch 16 after about a half-second to deenergize the relay winding 15. A delay unit 36, shown in Fig. 4, is of standard construction where the series circuit through the unit 36 is from terminal 90, resistor or heater 91, contacts 92, bimetal strip 93 to the terminal 94. When current flows through the resistor 91 the temperature within the unit rises to flex the bimetal strip 93 and hereby open contact 92. When the temperature within the unit drops, the contacts 92 close again. The half-second delay is to insure that the switches 19, 20 and 21 do not cause deenergization of the relay winding 15 during transient oscillation about the zero position.

When relay winding 15 is deenergized, switches 16, 17 and 18 are closed to the left in Fig. 2 so that switch 16 completes the circuit from power supply + to the switches 38 and 39 and switch 17 closes the circuit from + to switch 22. Although switch 18 opens, the relay 25 is maintained in the energized condition by switch 27. The instrument is now ready to accept observations, and at the first observation the "Insert Bearing" key or switch 22 is closed to energize relay winding 37 from + through switches 22, 17, 31 and 65.

The energized relay winding 37 draws the movable contacts of switches 38, 39, 40 to the left in Fig. 3 to accomplish the following: Switch 40 energizes brake winding 151 which applies brakes 152, 153, 154 and 155 to the shafts 103, 123, 129 and 205 respectively freezing these shafts at the positions they held at the initial observation. Thus, the position of shaft 205 corresponds to $B_1$ the initial bearing, while the shafts 103, 123, 129 are locked so the shaft 101, 120 and 127 alone drive the rotor windings 108, 118 and 125 respectively. It will be seen that the output of rotor windings 144 corresponds to $B-B_1$ or $\Delta B$. Switch 39 connects the power supply + to relay winding 41 through normally closed switch 42 to energize said relay winding and draw the movable contacts of switches 43, 44, 45 and 46 to the left in Fig. 3. Switch 38 completes a holding circuit from power supply + to relay winding 37 through time-delay unit 47 so that switch 22 need be only momentarily closed to complete the operations described. After a second or so, relay winding 37 is deenergized as time delay unit 47 opens the holding circuit.

Closure of switches 43, 44, 45 and 46 to the left accomplishes the following: Switch 43 completes an alternate circuit from + through switch 16 to hold relay winding 41 energized; switch 45 opens the circuits energizing relay winding 112 to open the circuits to motors 104, 124, 130. In addition relay winding 112 closes switch 40a to maintain energization of brake winding 151. Switch 46 opens the circuit to relay winding 148 to remove the signal from motor 145.

Switch 44 completes the circuit between relay winding 49 and switch 39 through switch 48 so that when relay 37 is deenergized and switch 39 is closed to the right the relay winding 49 is energized to draw the movable contacts of switches 42, 50 and 51 to the left. Switch 50 completes a holding circuit for relay winding 49 while switch 42 prepares the circuit for energization of relay winding 52 upon receipt of the second observation. Switch 51 energizes relay winding 53 through switch 54 to cause movable contacts of the switches 55, 56 to be drawn to the left. Switch 55 completes a self holding circuit through time delay unit 57 which operates upon opening of switch 54, while switch 56 energizes the relay winding 150 of Fig. 2 to draw the movable contacts of switches 156, 157, 158 and 159 to the left in Fig. 2.

Operation of switches 156, 157 and 158 to the left in Fig. 2 has no significance at this time, but operation of switch 159 to the left connects the output of rotor windings 144 of differential 143 to the stator windings 160 of control transformer 161, the rotor winding 162 of which is connected through contacts on switch 159 to the control field winding 163 of motor 164. The main field winding 165 of motor 164 is energized by $\phi_2$ so that the motor 164 drives shaft 207 and thereby drives the rotor winding 162 toward the null position where the output of rotor winding 162 is zero and the displacement of shaft 207 corresponds to the output of rotor winding 144, the change in bearing since the first observation, $\Delta B$.

The instrument is now ready to accept a second observation, and when the second bearing is available, key 22 is depressed again to accomplish the following: Relay winding 37 is energized to close holding switch 38 and switch 39 to the left. Switch 39 now energizes relay winding 52 through switches 42 and 63. The relay winding 52 then operates switches 58, 48, 59, 60 to the left resulting in the following: Switch 58 completes a holding circuit for relay winding 52 from the power supply + at switch 16; switch 59 connects the power supply + from switch 33 to relay winding 61 to energize said winding; switch 60 connects the power supply + to the heater winding 29 of thermal delay 24 causing the temperature of the heater winding 29 to rise as a result of the current flowing therein; switch 48 completes the circuit from the power supply + at switch 39 to relay winding 62 when relay winding 37 is deenergized (after key 22 and the holding circuit through delay unit 47 is released) so that relay winding 62 is energized and the switches 63, 64, 65 are closed to the left in Fig. 2.

Energization of relay winding 61 draws the movable contacts of switches 66, 67 and 54 to the left to accomplish the following: Switch 66 completes a circuit through time-delay unit 68 to hold relay winding 61 energized for about a half second after operation of switch 33 to the left as will be described.

Switch 67 energizes brake winding 180 to apply brakes 181, 182, 183 and 184 to the shafts 107, 118a, 125a and 207 respectively to hold said shafts against rotation. Motors in servo units 100', 121' and motor 128 continue to drive the spring connectors such as 106, on the output shafts of the differentials driven by said motors.

Switch 54 opens the energizing circuit of relay winding 53 which is held closed however for a few moments by the holding circuit through switch 55 and time delay unit 57 to allow brakes 181, 182, 183 and 184 time to set. Deenergization of relay winding 53 results in deenergization of relay winding 150 by switch 56 to cause operation of the switches 156, 157, 158 and 159 in Fig. 2 to the right.

Closure of switch 156 to the right connects the $ON_1$ output of rotor winding 108 to the memory circuit 166 in which control field winding 167 of motor 168 is energized jointly by the output of rotor winding 169 of potentiometer 170 and the input to the memory unit 166 from switch 156. Primary winding 171 of potentiometer 170 is energized by $\phi_1$ and the main field winding 172 of motor 168 is energized by $\phi_2$ so that motor 168 drives shaft 173 and rotor winding 169 until the output of rotor winding 169 matches the output of rotor winding 108 and motor 168 is deenergized. In this condition the output of rotor winding 169 is proportional to own ship distance traveled with $ON_1$ between the first and second observations. Closure of switch 157 to the right connects rotor winding 118 to a similar memory unit 174 in which the rotor winding 175 of potentiometer 176 is driven by shaft 177 and is positioned so that the output of rotor winding 175 matches the output of rotor winding 118, the distance traveled east by own ship during the inverval between the first and second observations, $OE_1$.

Also, the $\Delta t_1$ output of rotor winding 125 is connected to memory unit 178 through switch 158, so that the output of potentiometer 179 is matched to the output of rotor winding 125. The output of potentiometers 179 is therefore proportional to the time elapsed between the first and second bearing $\Delta t_1$.

Operation of switch 159 to the right transfers the input of control transformer 161 from rotor windings 144 to the stator windings 185 of self synchronous transmitter 186, the rotor winding 187 of which is energized by $\phi_1$ and is driven by shaft 206 of motor 188. The control field winding 189 of motor 188 is energized by the output of the rotor winding 162 of control transformer 161 while the main field winding 190 of motor 188 is energized by $\phi_2$. Motor 188 therefore acts to drive rotor winding 187 toward the position where the output of rotor winding 162 is zero, or where the positions of shaft 206 corresponds to the position of shaft 207. Thus when motor 188 has deenergized itself, the position of shaft 206 corresponds to the difference in bearing between the first and second observations, $\Delta B_1$. The motor 188 and transmitter 186 connected as described constitute a memory unit 191 for preserving the value of $\Delta B_1$ at shaft 206.

Switch 63, operated after deenergization of relay 37, connects the relay winding 69 to the left hand stationary contact of switch 39; switch 64 maintains relay winding 62 in the energized condition from the power supply + at switch 16 upon subsequent operation of switch 39 to the left and switch 65 opens the circuit from power supply + through switches 31 and 17 to switch 22 to prevent the instrument from accepting further data until ready.

After about five seconds, the temperature of thermal delay 24 has increased sufficiently to open the contacts 23 thereby causing deenergization of the relay windings 25 and also of relay winding 30 as switch 26 is opened. Operation of the switches 31, 32, 33 to be left upon deenergization of winding 30 results in the following: Switch 31 connects the power supply + to switch 22 through the contacts 23 of thermal delay 24 so that relay 37 can be actuated only after thermal delay unit 24 allows contacts 23 to close i.e. after sufficient cooling as switch 28 opens the circuit through heater 29; switch 32 deenergizes relay 290 to enable the motors 253, 260, 266 and 273 to seek a solution for the course and speed values by energizing the respective main field windings from $\phi_2$; switch 33 connects the power supply + to the brake winding 192 to cause application of the brakes 193, 194, 195 and 196 to the shafts 173, 177, 179' of potentiometer 179, and 206 respectively to lock the outputs of the memory units 166, 174, 178 and 191 at $ON_1$, $OE_1$, $\Delta t_1$ and $\Delta B_1$ respectively. Switch 33 also removes the voltage energizing relay winding 61 through switch 59 so that after about a half second as controlled by time delay unit 68 the relay winding 61 is deenergized and switches 66, 67 and 64 are operated to the right.

Switch 67 opens the circuit to brake winding 180 to free the shafts 107, 118a, 125a and 207. The first three, namely shafts 107, 118a and 125a are then driven into agreement with shafts 105, 120a, 127a by the spring drive connections such as 106, so that the outputs of rotor windings 108, 118 and 125 are continuously proportional to $ON_2$, $OE_2$ and $\Delta t_2$ respectively the distances traveled north and east by own ship and the time elapsed since the initial observation. Switch 54 reenergizes relay winding 53 to result in operation of the switches 156, 157, 158 and 159 to the left as previously explained, so that the signals to the memory units are removed and shaft 207 is continuously positioned according to $\Delta B_2$.

At the third observation, the outputs $ON_2$, $OE_2$, $\Delta t_2$ and $\Delta B_2$ are frozen at the corresponding values and it will be seen that the solution for course and speed is obtained at the motors 253 and 260 as previously described. Thus, at the third observation key 22 is again depressed to draw switch 39 to the left thereby energizing relay winding 69 through switches 42 and 57. Relay winding 69 draws the movable contacts of switches 70, 71 and 72 to the left with the following effects: Switch 71 energizes relay winding 61 to cause application of brakes 181, 182, 183 and 184 to the corresponding shafts to freeze the values of $ON_2$, $OE_2$, $\Delta t_2$ and $\Delta B_2$; switch 72 maintains energization of relay winding 53 even though switch 54 is opened by relay winding 61; switch 73 energizes relay winding 197 to throw switches 198 to the left in Fig. 2 thereby disconnecting the range signal applied to terminals 199 from the range servo 199'. The range servo normally positions shaft 208 according to present range, but energization of relay winding 197 freezes the position of shaft 208 at R the range at the third observation.

If it is desired to drop the third observation the switch 74 is manually operated to the left to energize relay winding 75 from the power supply + through contacts 23 of the thermal relay. Energization of relay 75 operates switches 76 and 77 to the right. Switch 76 opens the holding circuit for relay 69 thereby deenergizing same while switch 77 completes a holding circuit for relay 75 through the time delay unit 78. After about a half second to allow relay 69 to be deenergized the time delay unit 78 opens to deenergize relay winding 75 and the relays 69, 61 and 53 are all returned to the condition they were in first prior to the insertion of the third observation, so that the instrument maintains its quantities of $ON_1$, $OE_1$, $\Delta t_1$ and $\Delta B_1$ but receives new values of $ON_2$, $OE_2$, $\Delta t_2$, $\Delta B_2$ and R.

If it should be found desirable to drop the middle observation so that the last observation will become the second or middle observation, switch 74 is operated to the right in Fig. 2. This will cause the relay winding 25 to be energized returning the instrument to the condition just after the depression of key 22 for the insertion of the second observation; i.e. relays 41, 49, 52, 62, 25, 30, 61 and 53 are all energized so that the memory units 166, 174 and 178 set up to the values of rotor windings 108, 118, and 125 while shaft 206 is driven into correspondence with shaft 207. After the five second interval the thermal delay unit 24 opens contacts 23 to cause the instrument to attain the conditions for acceptance of the third observation as previously described.

The preceding description shows how the instrument determines target course, target speed and target angle from three separate bearings and the value of range at the third observation.

If the value of the target angle or speed of the target is known instead of the value of range the circuit of Fig. 2 will provide a solution for the other unknowns. For example, if the target angle is known the range servo 199' is disabled and the range shaft 208 is manually adjusted by the crank 208' until the reading of A at dial 280 agrees with the known value of A. The position of shaft 208 is then the range to the target.

We claim:
1. In an ordnance calculating apparatus for determining the course and speed of a moving target from observations of bearings taken at three different times and one observation of range comprising, means for storing values and elapsed time of the rectangular coordinates of travel of own ship during a first elapsed time, first resolver means energized proportional to the distances travelled along the same rectangular coordinates up to a second elapsed time, second resolver means energized according to said stored values, a third resolver means energized according to the range value at the end of the second elapsed time and adjusted according to the change of bearing at the end of said second elapsed time, a fourth resolver means energized by the combined outputs of the first, second and third resolver means and controlled by the change of bearing at the end of said first elapsed time, a potentiometer connected to said fourth resolver means, motive means controlled by the output of said fourth resolver and driving said potentiometer, a fifth resolver means energized according to the sum of the outputs of said first and third resolver means and the output of said potentiometer, a shaft and means for controlling said shaft according to the initial bearing and adapted to drive said first, second and fifth resolver means, a sixth resolver means energized by the outputs of said fifth resolver means and second motive means energized by one output of said sixth resolver means and adapted to control said sixth resolver means.

2. In an ordnance calculating apparatus for determining the course and speed of a moving target from observations of bearings taken at three different times and one observation of range comprising, means for storing values and elapsed time of the rectangular coordinates of travel of own ship during a first elapsed time, first resolver means energized proportional to the distances travelled along the same rectangular coordinates up to a second elapsed time, second resolver means energized according to said stored values, a third resolver means energized according to the range value at the end of the second elapsed time and adjusted according to the change of bearing at the end of said second elapsed time, a fourth resolver means having both windings energized by the combined outputs of the first, second and third resolver means and controlled by the change of bearing at the end of said first elapsed time, a potentiometer connected to said fourth resolver means, motive means controlled by the output of said fourth resolver and driving said potentiometer, a fifth resolver means energized according to the sum of the outputs of said first and third resolver means and the output of said potentiometer, a shaft and means for controlling said shaft according to the initial bearing and adapted to drive said first, second and fifth resolver means, a sixth resolver means energized by the outputs of said fifth resolver means and second motive means energized by one output of said sixth resolver means and adapted to control said sixth resolver means.

3. In an ordnance calculating apparatus for determining the course and speed of a moving target from observations of bearings taken at three different times and one observation of range comprising, means for storing values and elapsed time of the rectangular coordinates of travel of own ship during a first elapsed time, first resolver means energized proportional to the distances travelled along the same rectangular coordinates up to a second elapsed time, second resolver means energized according to said stored values, a third resolver means energized according to the range value at the end of the second elapsed time and adjusted according to the change of bearing at the end of said second elapsed time, a fourth resolver means energized by the combined outputs of the first, second and third resolver means and controlled by the change of bearing at the end of said first elapsed time, a potentiometer connected to said fourth resolver means, motive means controlled by the output of said fourth resolver and driving said potentiometer, a fifth resolver means energized according to the sum of the outputs of said first and third resolver means and the output of said potentiometer, a shaft and means for controlling said shaft according to the initial bearing and adapted to drive said first, second and fifth resolver means, a sixth resolver means energized by the outputs of said fifth resolver means and second motive means energized by one output of said sixth resolver means and adapted to control said sixth resolver means, the displacement of said second motive means indicating the course and the other output of said sixth resolver means indicating the speed of said target.

4. In an ordnance calculating apparatus for determining the course and speed of a moving target from observations of bearings taken at three different times and one observation of range comprising, means for storing values and elapsed time of the rectangular coordinates of travel of own ship during a first elapsed time, first resolver means energized proportional to the distances travelled along the same rectangular coordinates up to a second elapsed time, second resolver means energized according to said stored values, a third resolver means energized according to the range value at the end of the second elapsed time and adjusted according to the change of bearing at the end of said second elapsed time, a fourth resolver means having both windings energized by the combined outputs of the first, second and third resolver means and controlled by the change of bearing at the end of said first elapsed time, a potentiometer connected to said fourth resolver means, motive means controlled by the output of said fourth resolver and driving said potentiometer, a fifth resolver means energized according to the sum of the outputs of said first and third resolver means and the output of said potentiometer, a shaft and means for controlling said shaft according to the initial bearing and adapted to drive said first, second and fifth resolver means, a sixth resolver means energized by the outputs of said fifth resolver means and second motive means energized by one output of said sixth resolver means and adapted to control said sixth resolver means, the displacement of said second motive means indicating the course and the other output of said sixth resolver means indicating the speed of said target.

5. In an ordnance calculating apparatus for determining the course and speed of a moving target from observations of bearings taken at three different times and one observation of range comprising, means for storing values and elapsed time of the rectangular coordinates of travel of own ship during a first elapsed time, first resolver means energized proportional to the distances travelled along the same rectangular coordinates up to a second elapsed time, second resolver means energized according to said stored values, a third resolver means energized according to the range value at the end of the second elapsed time and adjusted according to the change of bearing at the end of said second elapsed time, a fourth resolver means energized by the combined outputs of the first, second and third resolver means and controlled by the change of bearing at the end of said first elapsed time, a potentiometer connected to said fourth resolver means, motive means controlled by the output of said fourth resolver and driving said potentiometer, a fifth resolver means energized according to the sum of the outputs of said first and third resolver means and the output of said potentiometer, a shaft and means for controlling said shaft according to the initial bearing and adapted to drive said first, second and fifth resolver means, a sixth resolver means energized by the outputs of said fifth resolver means and second motive means energized by one output of said sixth resolver means and adapted to control said sixth resolver means, a value proportional to said second elapsed time, means for obtaining the ratio of said first elapsed time to said second elapsed time, a second potentiometer energized by the outputs of said first and third resolver means and adjusted according to the ratio between said elapsed times, the output of said second potentiometer being interposed in the connections between said second and said fourth resolver means, a third potentiometer energized by the output of said first potentiometer and adjusted according to the ratio between said elapsed times, the output of said third potentiometer being interposed in the connections between said first, second, third and fourth resolver means.

6. In an ordnance calculating apparatus for determining the course and speed of a moving target from observations of bearings taken at three different times and one observation of range comprising, means for storing values and elapsed time of the rectangular coordinates of travel of own ship during a first elapsed time, first resolver means energized proportional to the distances travelled along the same rectangular coordinates up to a second elapsed time, second resolver means energized according to said stored values, a third resolver means energized according to the range value at the end of the second elapsed time and adjusted according to the change of bearing at the end of said second elapsed time, a fourth resolver means energized by the combined outputs of the first, second and third resolver means and controlled by the change of bearing at the end of said first elapsed time, a potentiometer connected to said fourth resolver means, motive means controlled by the output of said fourth resolver and driving said potentiometer, a fifth resolver means energized according to the sum of the outputs of said first and third resolver means and the output of said potentiometer, a shaft and means for controlling said shaft according to the initial bearing and adapted to drive said first, second and fifth resolver means, a sixth resolver means energized by the outputs of said fifth resolver means and second motive means energized by one output of said sixth resolver means and adapted to control said sixth resolver means, a value proportional to said second elapsed time, means for obtaining the ratio of said first elapsed time to said second elapsed time, a second potentiometer energized by the outputs of said first and third resolver means and adjusted according to the ratio between said elapsed times, the output of said second potentiometer being interposed in the connections between said second and said fourth resolver means, a third potentiometer energized by the output of said first potentiometer and adjusted according to the ratio between said elapsed times, the output of said third potentiometer being interposed in the connections between said first, second, third and fourth resolver means.

References Cited in the file of this patent

UNITED STATES PATENTS 2,600,159    Ergen _____ June 10, 1952